United States Patent
Feltham et al.

(10) Patent No.: US 12,005,760 B2
(45) Date of Patent: Jun. 11, 2024

(54) DEVICES, SYSTEMS, AND VEHICLES FOR PROVIDING VENTILATION

(71) Applicant: Rivian IP Holdings, LLC, Plymouth, MI (US)

(72) Inventors: Graham Lloyd Feltham, Garden City, MI (US); Danny Jierian, Diamond Bar, CA (US); Jake DeBoer, Mission Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 101 days.

(21) Appl. No.: 17/696,938

(22) Filed: Mar. 17, 2022

(65) Prior Publication Data

US 2023/0294479 A1    Sep. 21, 2023

(51) Int. Cl.
B60H 1/00    (2006.01)

(52) U.S. Cl.
CPC ..... B60H 1/00864 (2013.01); B60H 1/00285 (2013.01); B60H 1/00564 (2013.01); B60H 1/00842 (2013.01); B60H 1/00871 (2013.01); *B60H 2001/003* (2013.01)

(58) Field of Classification Search
CPC ........... B60H 1/00864; B60H 1/00285; B60H 1/00564; B60H 1/00842; B60H 1/00871; B60H 2001/003
USPC ........................................................ 454/118
See application file for complete search history.

(56) References Cited

U.S. PATENT DOCUMENTS

| | | | | |
|---|---|---|---|---|
| 6,105,667 A * | 8/2000 | Yoshinori | .......... | B60H 1/00285 219/202 |
| 6,902,473 B1 * | 6/2005 | Goobeck | ............ | B60H 1/00592 454/903 |
| 7,891,725 B2 * | 2/2011 | Blair | ...................... | B62D 31/02 296/178 |
| 7,909,379 B2 * | 3/2011 | Winget | ................. | B60R 21/026 410/129 |
| 2018/0117987 A1 | 5/2018 | Yamaoka et al. | | |
| 2020/0164722 A1 * | 5/2020 | Baker | .................. | B60H 1/3428 |

FOREIGN PATENT DOCUMENTS

DE    19737636 A1    3/1999
JP    2007186152 A    7/2007

OTHER PUBLICATIONS

Jul. 12, 2023 European Search Report issued in Corresponding EP Application No. 22205037.

* cited by examiner

*Primary Examiner* — Allen R. B. Schult
(74) *Attorney, Agent, or Firm* — Foley & Lardner LLP

(57) ABSTRACT

Various disclosed embodiments include illustrative devices, systems, and vehicles for heating, ventilation and air conditioning (HVAC) functions for an area remote from an HVAC system. In an illustrative embodiment, a device includes a seat having a first section of duct having a first end, a second section of duct couplable to the first section of duct, and a third section of duct couplable to the first section of duct. The second section of duct connects at a first end to an air supply source and at a second end to the first end of the first section of duct. The third section of duct includes an exhaust vent configured to direct air received from the air supply source in a direction aft of the seat.

20 Claims, 5 Drawing Sheets

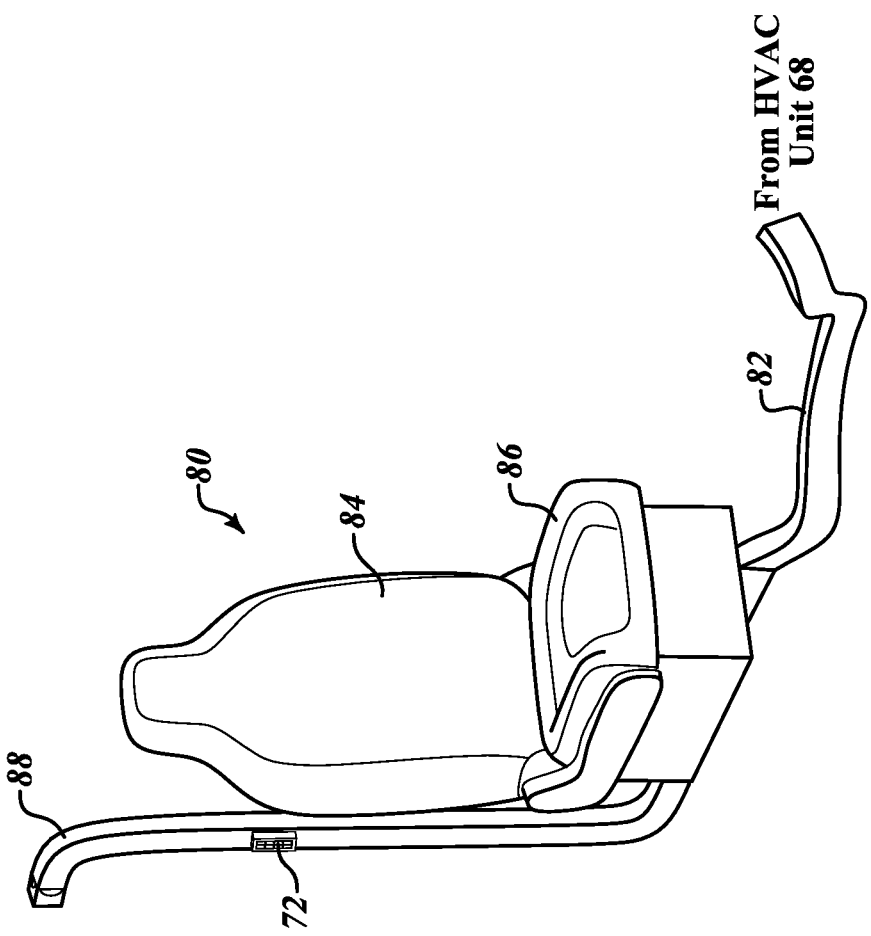
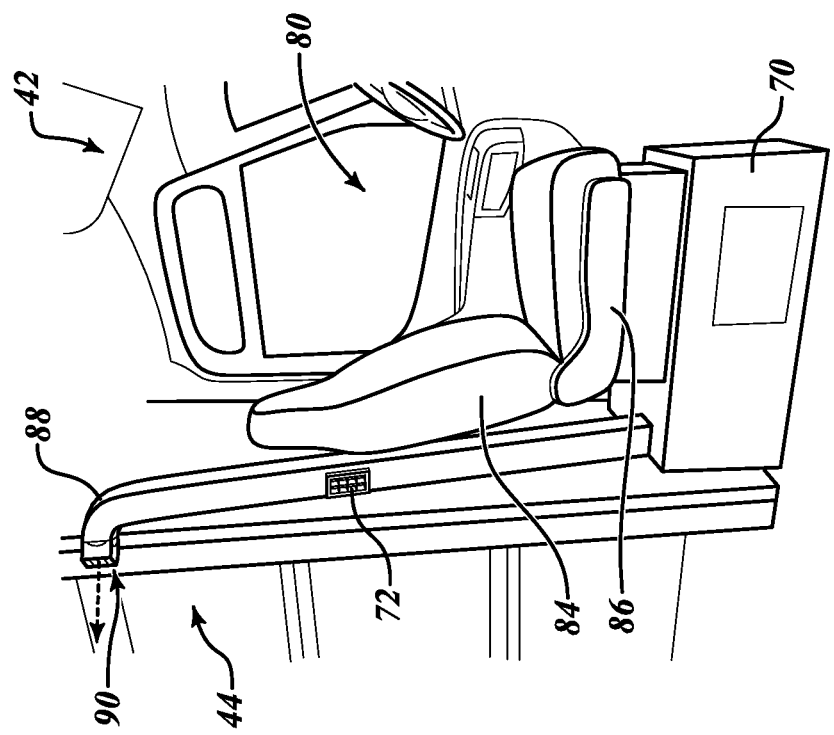

ical embodiments are illustrated in referenced fig-
DEVICES, SYSTEMS, AND VEHICLES FOR PROVIDING VENTILATION

INTRODUCTION

The present disclosure relates to vehicle climate control. The statements in this section merely provide background information related to the present disclosure and may not constitute prior art.

In vehicles with a cargo space or areas without direct heating/cooling, air convection, not conditioning, such as with roof fans may be used to control temperature. These solutions do not heat or cool the air. To perform heating and/or cooling in zones separated from a cabin by a wall/door/closure, an entirely separate heating, ventilation, and air conditioning system is used.

BRIEF SUMMARY

Various disclosed embodiments include illustrative devices, systems, and vehicles for heating, ventilation and air conditioning (HVAC) functions for an area remote from an HVAC system.

In an illustrative embodiment, a device includes a seat having a first section of duct having a first end, a second section of duct couplable to the first section of duct, and a third section of duct couplable to the first section of duct. The second section of duct connects at a first end to an air supply source and at a second end to the first end of the first section of duct. The third section of duct includes a vent (e.g., an exhaust vent) configured to direct air received from the air supply source in a direction aft of the seat.

In another illustrative embodiment, a system includes an interface device configured to receive instructions from a user, an air supply unit, a controller configured to command the air supply unit to output air at a particular temperature responsive to the received instructions, a seat having first section of duct having a first end, a second section of duct that connects at a first end to an air supply source and at a second end to the first end of the first section of duct and a third section of duct configured to connect to the first section of duct. The third section of duct includes a vent (e.g., an exhaust vent) configured to direct air received from the air supply source in a direction aft of the seat.

In another illustrative embodiment, a vehicle includes a cabin, a cargo bay disposed aft of the cabin, an interface device configured to receive instructions from a user, an air supply unit, a controller configured to command the air supply unit to output air at a particular temperature responsive to the received instructions, a seat disposed in the cabin, wherein the seat includes a first section of duct having a first end, a second section of duct that connects at a first end to an air supply source and at a second end to the first end of the first section of duct, and a third section of duct that connects to the first section of duct. The third section of duct includes a vent (e.g., an exhaust vent) configured to direct air received from the air supply source in a direction aft of the seat.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIG. 3 is a perspective view of a portion of the HVAC system used in the vehicle of FIG. 1.

FIG. 4 is a perspective view of components of the HVAC system of FIG. 3.

Like reference symbols in the various drawings generally indicate like elements.

DETAILED DESCRIPTION

Figure 1:
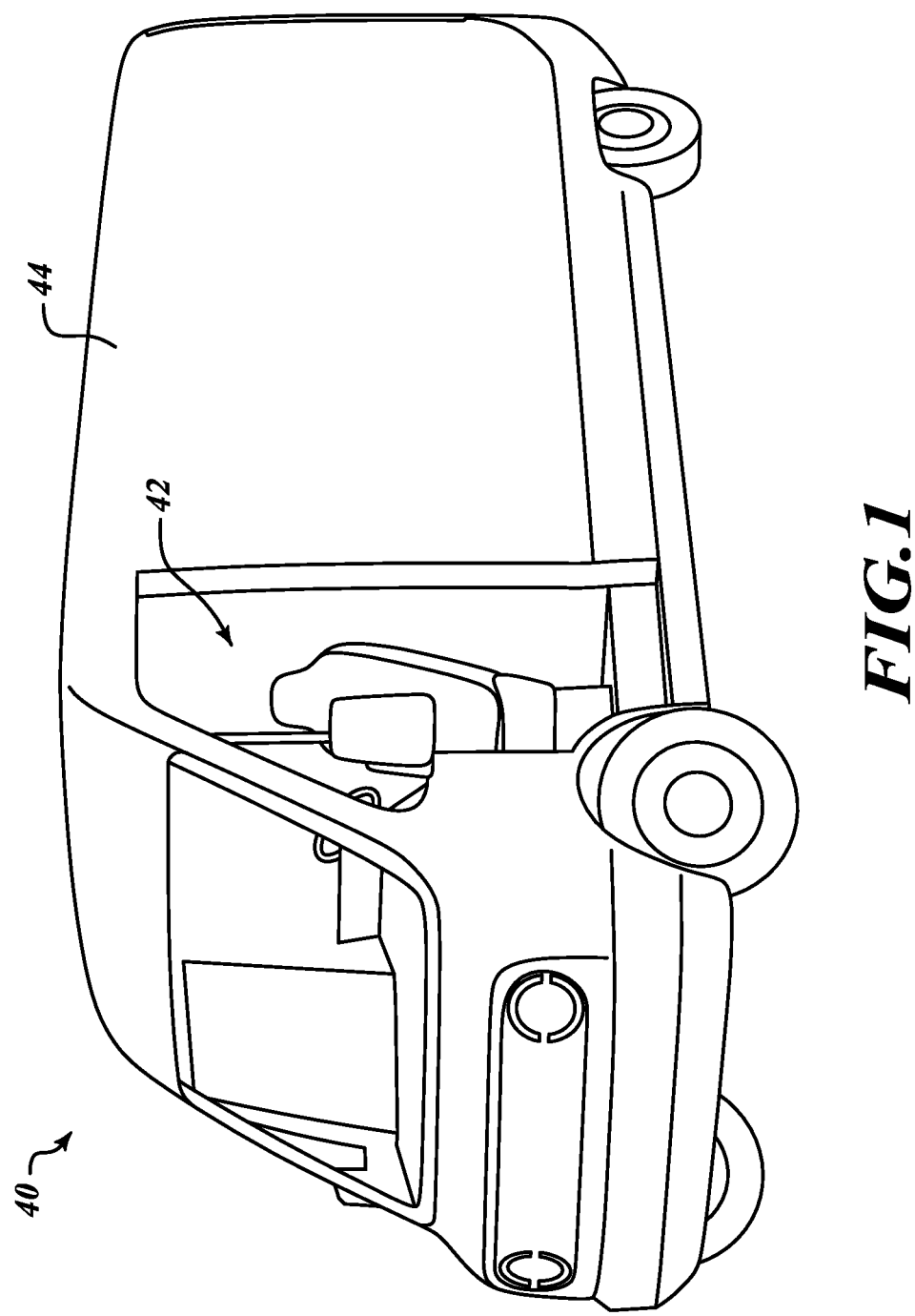
FIG. 1 is a perspective view of an illustrative vehicle with a combined cabin and cargo bay heating, ventilation, and air conditioning (HVAC) system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative devices, systems, and vehicles for heating, ventilation and air conditioning (HVAC) functions for an area remote from an HVAC system.

Given by way of non-limiting overview and referring to FIGS. 1-5, in various embodiments, an illustrative vehicle 40 includes a cabin 42, a cargo bay 44 disposed aft of the cabin 42 (i.e., in a direction opposite the front of the vehicle), and a seat and cargo bay heating, ventilation, and air conditioning (HVAC) system 50. The cargo bay 44 may be other areas in need of venting, cooling, and/or heating, such as, without limitation, a seating area, an inside or an outside sleeping area, a living area, a heating unit, a cooling unit (food/drink cooler), a work area, a storage area, or the like. The HVAC system 50 may provide simultaneous heating, venting, or cooling to a seat 80 located in the cabin 42 and the cargo bay 44. The HVAC system 50 may include an interface device 62, an air supply source, and a controller 60. The air supply source may be an HVAC unit 68. The controller 60 is configured to command the HVAC unit 68 to output air at a particular temperature, recirculate air, and/or pump in exterior air responsive to instructions received by the interface device 62. The cabin 42 includes a first section(s) of duct 94 disposed within the seat 80. The first section(s) of duct 94 includes a first end. The cabin 42 also includes a second section of duct 82 that connects at a first end to the HVAC unit 68 and at a second end to the first end of the first section(s) of duct 94. The cabin 42 also includes a third section of duct 88 that connects to a distal end of the first section(s) of duct 94. The third section of duct 88 includes an exhaust vent 90 configured to direct air received from the HVAC unit 68 in a direction aft of the seat 80 (e.g., in a direction opposite the direction of a seat back) towards an aft section of the vehicle 40, such as, without limitation, the cargo bay 44. The exhaust vent 90 may be connected to the third section of duct 88 via a swivel device or mechanism, such as, without limitation, a hinge, a pivot pin, or comparable device.

Given by way of non-limiting example, in various embodiments the vehicle 40 may include a motor vehicle driven by wheels and/or tracks, such as, without limitation, an automobile, a truck, a sport utility vehicle (SUV), a van, and the like. Given by way of further non-limiting examples, in various embodiments the vehicle 40 may include a marine vessel such as, without limitation, a boat, a ship, a submarine, a submersible, an autonomous underwater vehicle (AUV), and the like. Given by way of further non-limiting examples, in various embodiments the vehicle 40 may include an aircraft such as, without limitation, a fixed wing aircraft, a rotary wing aircraft, and a lighter-than-air (LTA) craft.

Given by way of non-limiting example, in various embodiments the HVAC unit 68 includes a heat exchanger, a blower motor, an evaporator coil, and a thermostat. HVAC systems are well known in the art and no further explanation is necessary for a person of skill in the art to understand disclosed subject matter.

Figure 2:
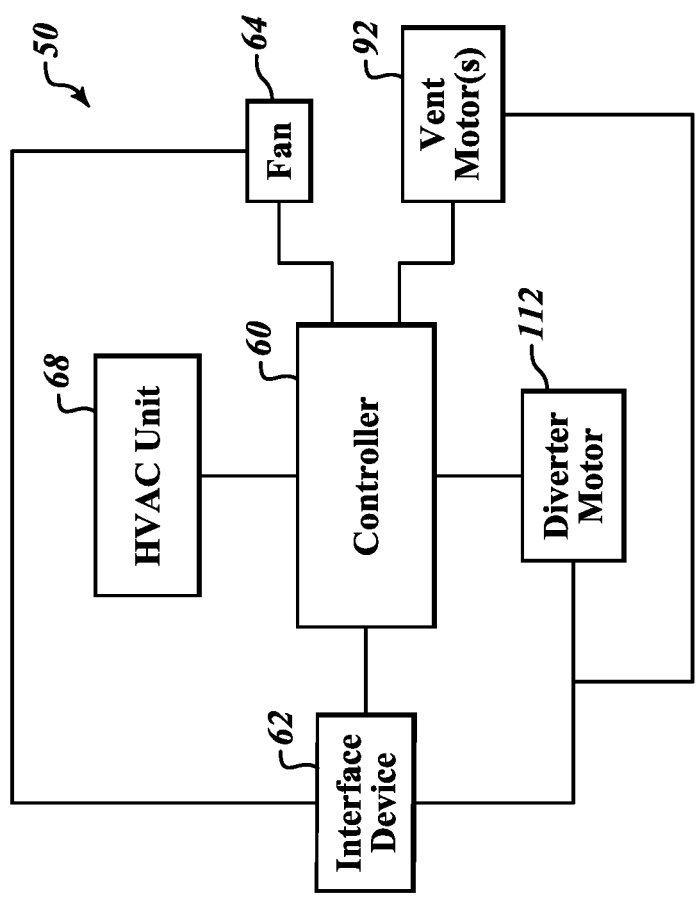
FIG. 2 is a block diagram of an illustrative HVAC system used in the vehicle of FIG. 1.
Figure 6:
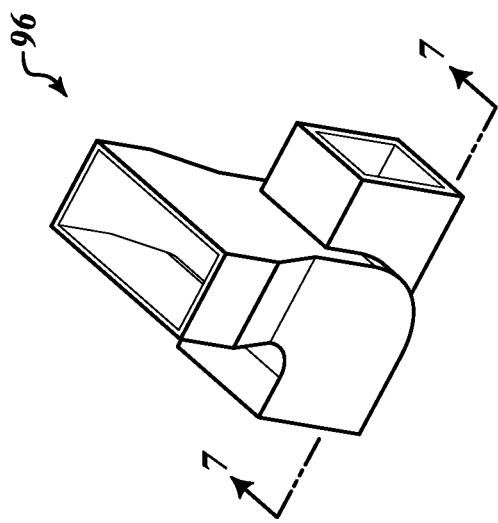
FIG. 6 is a perspective view of a diverter included within the components of FIG. 5.

As shown in FIG. 2, in various embodiments, the vehicle 40 includes the HVAC system 50 having various electrical components. The HVAC system 50 may include the controller 60 that is in an electrical/signal communication with the interface device 62, an optional fan 64, the HVAC unit 68, an optional vent motor(s) 92, and an optional diverter motor 112. The controller 60 receives instructions/signals from the interface device 62. The instructions/signals may include heating, venting, and/or cooling requests. Responsive to the instructions/signals, the controller 60 sends a command instruction(s) to the HVAC unit 68, the fan 64, the vent motor(s) 92, and/or the diverter motor 112, accordingly.

In various embodiments and given by way of example only and not of limitation, the interface device 62 may include mechanical buttons, switches, voice recognition capabilities, gesture recognition capabilities, or may include selectable graphical user interface features presented on a vehicle display device(s) or via an application program executable by a person electronic device. The interface device 62 allows a vehicle operator to select heating, venting, and/or cooling operational modes of the vehicle seat 80 and/or the cargo bay 44. The interface device 62 may also include control switches located on or near the seat 80. The interface device 62 may be directly connected to the fan 64, the vent motor(s) 92 and/or the diverter motor 112. The control switches are configured to activate the fan 64, the vent motor(s) 92 and/or the diverter motor 112.

As shown in FIGS. 3-9, in various embodiments, the illustrative cabin 42 includes a seat and cargo venting device 52. The seat and cargo venting device 52 includes the seat 80 having a seat section 86 and a seatback section 84. The seat 80 is slidably attached to a seat base 70 or the seat 80 and the seat base 70 are slidably attached to a floor of the cabin 42. The seat 80 and/or the seat base 70 includes first duct sections 94 of the seat and cargo venting device 52. The seat and cargo venting device 52 also includes a second duct section 82 and a third duct section 88. The second duct section 82 connects at a proximal end to the HVAC unit 68 of the vehicle 40. A distal end of the second duct section 82 is connected to a proximal end of the first duct sections 94. The third duct section 88 connects to a distal end of the first duct sections 94. The third duct section 88 may extend distally and/or vertically to a vent 90. The third duct section 88 may be attached to or placed within an aft bulkhead of the cabin 42. The bulkhead separates the cabin 42 from the cargo bay 44.

In various embodiments, the interface device 62 may include an occupancy detection sensor (ODS) 74 that detects a person seated in the seat 80. The ODS 74 may pass the seat occupancy detection information to the controller 60 or directly to the fan 64, the vent motor(s) 92 and/or the diverter motor 112 in the form of an activation signal.

Figure 5:
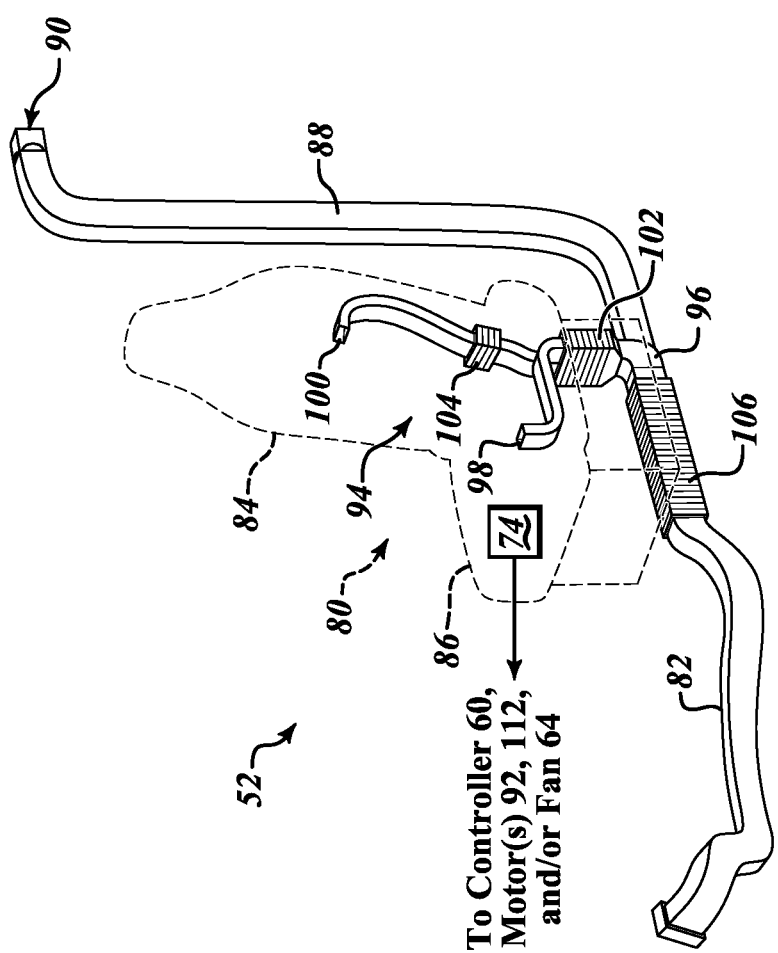
FIG. 5 is a perspective, partial x-ray view of the components of FIG. 3.

As shown in FIG. 5, in various embodiments, the illustrative first duct sections 94 may include an expandable base section 106, a diverter 96, and a vent section having an expandable and/or flexible first vertical section 102, a seat base outlet 98, an expandable and/or flexible second vertical section 104, and a seat back outlet 100. The base section 106 is coupled at a distal end to a proximal end of the diverter 96 and to the second duct section 82. As the seat 80 and/or the seat base 70 is moved either manually or by seat motors proximally and distally within the cabin 42, the base section 106 expands or compresses thereby maintaining the connections between the second duct section 82 and the diverter 96.

In various embodiments, still referring to FIG. 5, the diverter 96 includes an aft port that connects to a proximal end of the third duct section 88. The diverter 96 also includes a vertical port configured to attach to a bottom of the first vertical section 102. The seat base outlet 98 extends from a top end of the first vertical section 102. The second vertical section 104 extends vertically from the first vertical section 102 and is attached to the seat back outlet 100. The first vertical section 102 and the second vertical section 104 flex/expand as the seat section 86 and the seatback section 84 are tilted, either manually or via seat motors.

Figure 7:
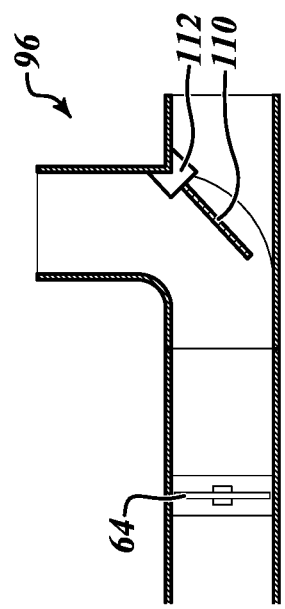
FIG. 7 is a cross-sectional view of the diverter of FIG. 6.

As shown in FIG. 7, in various embodiments the diverter 96 includes a hinged flapper valve (flap) 110 that is rotatably attached to an interior wall of the diverter 96. The hinged flapper valve 110 may be positioned to direct air coming from an inlet side of the diverter 96 to pass only through a vertical outlet side or a distal outlet end, or simultaneously through both the vertical outlet side and the distal outlet end. The hinged flapper valve 110 may be attached to a diverter motor 112 configured to receive instructions from the controller 60 or power from a switch controlled by the controller 60 or the interface device 62. The diverter motor 112 may be an electrical servomotor or comparable device. The diverter motor 112 may be located on the outside of the diverter 96 with a shaft extending into the diverter 96 to make rotary contact with the flapper valve 110. The hinged flapper valve 110 may also be attached to a manual level located external to the diverter 96 that is easily accessible to an operator of vehicle 30 while sitting in the seat 80. The diverter 96 may include other types of diverter valves, such as, without limitation, rotary vane valves and the like. Diverters are well known in the art and no further explanation is necessary for a person of skill in the art to understand disclosed subject matter.

In various embodiments, a fan 64 is located within the second duct section 82, the base section 106, the diverter 96, or the third duct section 88. The fan 64 receives power via a switch controlled by the controller 60 or the interface device 62.

Figure 9:
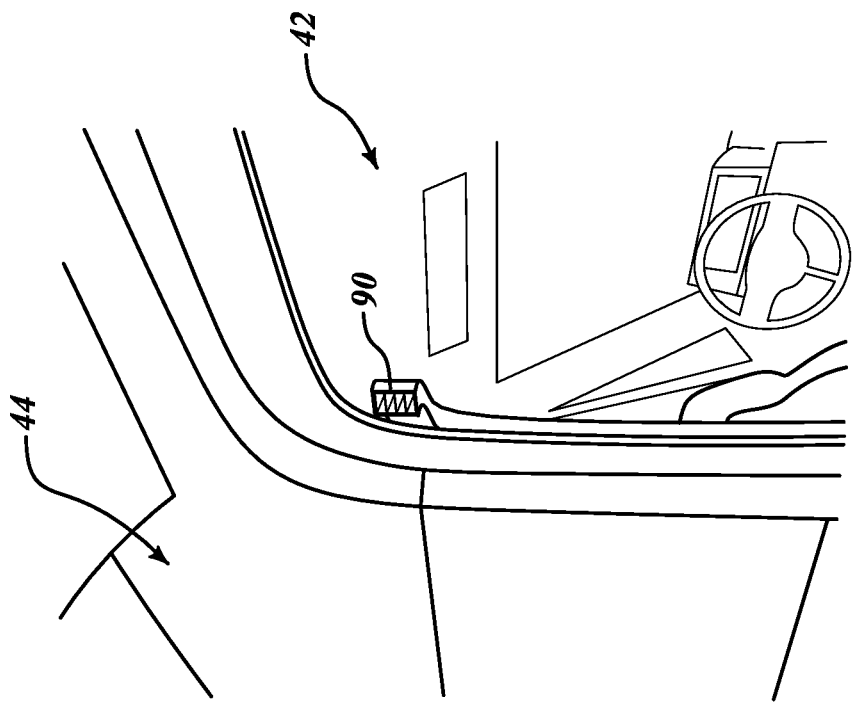
FIG. 9 is another perspective view within the vehicle of FIG. 1.
Figure 8:
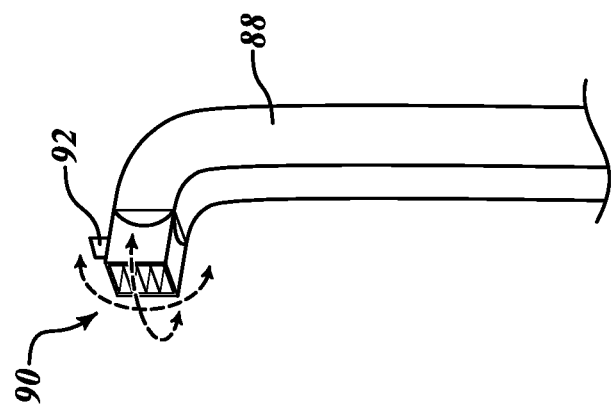
FIG. 8 is a perspective view of an aft component of the components of FIG. 5.

As shown in FIGS. 8 and 9, in various embodiments, the exhaust vent 90 is rotatably attached to a distal end of the third duct section 88. The exhaust vent 90 may be mounted at a pivot point, such as, without limitation, a pivot pin or hinge, to the third duct section 88. The exhaust vent 90 may also include rotatable vertical and/or horizontal louvers. The louvers may include devices for manually operating the louvers. The exhaust vent 90 may also include a motor(s) 92 that is attached to the louvers. The motor(s) 92 may connect between the third duct section 88 and the exhaust vent 90 thereby causing the exhaust vent 90 to rotate about the pivot point for directing air flow coming out of the exhaust vent 90. The motor(s) 92 may be controlled by the controller 60, by a switch controlled by the controller 60, and/or the interface device 62. The motor(s) 92 may be an electrical servomotor or comparable device.

In various embodiments, the exhaust vent 90 may direct air to the cargo bay 44 upon opening of a door located between the cabin 42 and the cargo bay 44. The door and the exhaust vent 90 may include mechanical, electromechanical, or magnetic devices that cause the exhaust vent 90 to rotate from directing air into the cabin 42 to directing air into the cargo bay 44 or cause the exhaust vent 90 to open or close depending upon the position of the door.

In various embodiments, referring back to FIGS. 3 and 4, an additional vent 72 is located on a vertical section of the third duct section 88. The additional vent 72 may be directed at a passenger area/seat located in the cabin 42. The additional vent 72 may include louvers that are directed at the passenger area or includes louvers that may be manually or automatically controlled to direct air at the passenger area. In various embodiments, the additional vent 72 may include a vent motor(s), similar to the vent motor(s) 92, for controlling operation of the louvers of the additional vent 72. The louvers may include devices for manually operating the louvers. The louvers of the additional vent 72 may be positioned to block airflow, to allow uninhibited airflow, and to allow airflow at any angle from the uninhibited airflow. The vent motor(s) for the additional vent 72 may be controlled by the controller 60 and/or the interface device 62, which may include an OBS located in a passenger seat.

In various embodiments, a passenger seat may include all the components described above for the seat 80. The venting components of the passenger seat may be controlled simultaneously with the venting components of seat 80 or may be controlled separate from the venting components of seat 80. The controller 60 may control airflow to a single bypass that leads to both the driver seat 80 and the passenger seat or to separate venting components for the driver seat 80 and the passenger seat.

In various embodiments, the passenger seat may include an ODS for sending seat occupancy detection information to the controller 60 or directly to a fan, similar to the fan 64), vent motor(s), similar to the vent motor(s) 92, and/or a diverter motor, similar to the diverter motor 112, in the form of an activation signal(s).

Those skilled in the art will recognize that at least a portion of the controller 60, the interface device 62, components, devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interactive devices (e.g., a touch pad, a touch screen, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A device comprising:
   a seat base including a first section of duct having a first end, the seat base to dispose within a cab of a vehicle;
   a second section of duct configured to connect at a first end to an air supply source and at a second end to the first end of the first section of duct; and
   a third section of duct configured to connect to the first section of duct, the third section of duct including:
   a vent configured to direct air received from the air supply source in a direction aft of the seat base; and
   the vent to dispose at least partially within a bulkhead of the vehicle, the bulkhead to dispose between the cab of the vehicle and a cargo bay of the vehicle.

2. The device of claim 1, wherein the vent is configured to direct air into the cargo bay.

3. The device of claim 1, wherein the vent includes a swivel device configured to cause the vent to be positioned in multiple directions.

4. The device of claim 3, wherein the swivel device includes a motor configured to control position of the vent responsive to a signal received from a second device chosen from a controller and an interface device.

5. The device of claim 1, wherein the first section of duct includes:
   a vent section disposed in a location chosen from a back section and a seat section; and
   a diverter configured to cause air received from the air supply source to be diverted into one of the vent section and the third section of duct.

6. The device of claim 5, wherein the diverter includes:
   a hinged flap; and
   a motor configured to control position of the hinged flap responsive to a signal received from a device chosen from a controller and an interface device.

7. The device of claim 1, further comprising a fan disposed at a location chosen from the first section of duct and the third section of duct, wherein the fan is configured to cause movement of air responsive to a signal received from a second device chosen from a controller and an interface device.

8. A system comprising:
   an interface device configured to receive instructions from a user;
   an air supply unit;
   a controller configured to command the air supply unit to output air at a particular temperature responsive to the received instructions;
   a seat base including a first section of duct having a first end, the seat base to dispose within a cab of a vehicle;
   a second section of duct configured to connect at a first end to the air supply unit and at a second end to the first end of the first section of duct; and
   a third section of duct configured to connect to the first section of duct, the third section of duct including:
   a vent configured to direct air received from the air supply unit in a direction aft of the seat base; and
   the vent to dispose at least partially within a bulkhead of the vehicle, the bulkhead to dispose between the cab of the vehicle and a cargo bay of the vehicle.

9. The system of claim 8, wherein the vent is configured to direct air into the cargo bay.

10. The system of claim 8, wherein the vent includes a swivel device configured to cause the vent to be positioned in multiple directions.

11. The system of claim 10, wherein the swivel device includes a motor configured to control position of the vent responsive to a signal received from a device chosen from the controller and the interface device.

12. The system of claim 8, wherein the first section of duct includes:
    a vent section disposed in a location chosen from a back section and a seat section; and
    a diverter configured to cause air received from the air supply unit to be diverted into one of the vent section and the third section of duct.

13. The system of claim 12, wherein the diverter includes:
    a hinged flap; and
    a motor configured to control position of the diverter responsive to a signal received from a device chosen from the controller and the interface device.

14. The system of claim 8, further comprising a fan disposed at a location chosen from the first section of duct and the third section of duct, wherein the fan is configured to cause movement of air responsive to a signal received from a device chosen from the controller and an interface device.

15. A vehicle comprising:
    a cabin;
    a cargo bay disposed aft of the cabin;
    an interface device configured to receive instructions from a user;
    an air supply unit;
    a controller configured to command the air supply unit to output air at a particular temperature responsive to the received instructions;
    a seat base disposed in the cabin, wherein the seat base includes a first section of duct having a first end;
    a second section of duct configured to connect at a first end to the air supply unit and at a second end to the first end of the first section of duct; and
    a third section of duct configured to connect to the first section of duct, the third section of duct including:
    a vent configured to direct air received from the air supply unit in a direction aft of the seat base; and
    the vent to dispose at least partially within a bulkhead of the vehicle, the bulkhead to dispose between the cabin of the vehicle and the cargo bay.

16. The vehicle of claim 15, wherein the vent is configured to direct air into the cargo bay.

17. The vehicle of claim 15, wherein the vent includes a motor configured to control position of the vent responsive to a signal received from a device chosen from the controller and the interface device.

18. The vehicle of claim 15, wherein the first section of duct includes:
    a vent section disposed in a location chosen from a back section and a seat section; and
    a diverter configured to cause air received from the air supply unit to be diverted into one of the vent section and the third section of duct.

19. The vehicle of claim 18, wherein the diverter includes:
    a hinged flap; and
    a motor configured to control position of the diverter responsive to a signal received from a device chosen from the controller and the interface device.

20. The vehicle of claim 15, further comprising a fan disposed at a location chosen from the first section of duct and the third section of duct, wherein the fan is configured to cause movement of air responsive to a signal received from a device chosen from the controller and the interface device.

\* \* \* \* \*